(12) United States Patent
Nielsen

(10) Patent No.: US 10,911,796 B2
(45) Date of Patent: *Feb. 2, 2021

(54) DYNAMIC QUALITY ADJUSTMENTS FOR MEDIA TRANSPORT

(71) Applicant: Amazon Technologies, Inc., Reno, NV (US)

(72) Inventor: Olaf Nielsen, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,213

(22) Filed: Nov. 19, 2019

(65) Prior Publication Data
US 2020/0084482 A1    Mar. 12, 2020

Related U.S. Application Data

(63) Continuation of application No. 15/906,673, filed on Feb. 27, 2018, now Pat. No. 10,523,978.

(51) Int. Cl.
| | |
|---|---|
| *H04N 21/2343* | (2011.01) |
| *H04N 21/2187* | (2011.01) |
| *H04N 21/2662* | (2011.01) |
| *H04N 21/236* | (2011.01) |
| *H04N 21/2385* | (2011.01) |
| *H04L 5/14* | (2006.01) |

(52) U.S. Cl.
CPC ..... *H04N 21/2343* (2013.01); *H04N 21/2187* (2013.01); *H04N 21/236* (2013.01); *H04N 21/2385* (2013.01); *H04N 21/2662* (2013.01); *H04L 5/14* (2013.01)

(58) Field of Classification Search
None
See application file for complete search history.

(56) References Cited

U.S. PATENT DOCUMENTS

| | | |
|---|---|---|
| 5,861,919 A | 1/1999 | Perkins |
| 6,084,910 A | 7/2000 | Stanger |
| 6,219,359 B1 | 4/2001 | Budge |
| 7,068,724 B1 | 6/2006 | Hamilton |

(Continued)

OTHER PUBLICATIONS

US Notice of Allowance dated Sep. 3, 2019 issued in U.S. Appl. No. 15/906,673.

*Primary Examiner* — Alexander Q Huerta
(74) *Attorney, Agent, or Firm* — Hogan Lovells US LLP

(57) ABSTRACT

A content provider might be responsible for content transmitted over a large number of channels, including premium channels that may have fixed quality settings. In order to provide the appropriate quality, the encoders for the premium channels are able to obtain the bit rates (and other capacity) needed. The total bit rate used for the premium channels can then be compared against a maximum bit rate for all channels for the provider to determine a remaining bit rate. The remaining bit rate can then be allocated, evenly or otherwise, across the various non-premium channels. Transmission components such as statmuxes used for the non-premium channels can be configured to adjust the bit rates as necessary based at least in part upon the allocation. Such an approach enables the premium channels to provide the fixed quality ensuring that the aggregate bandwidth meets the bit rate limit.

20 Claims, 10 Drawing Sheets

(56) References Cited

U.S. PATENT DOCUMENTS

| | | | |
|---|---|---|---|
| 7,292,602 B1 | 11/2007 | Liu | |
| 9,071,484 B1* | 6/2015 | Truax | H04N 21/44209 |
| 2001/0014121 A1 | 8/2001 | Kaye | |
| 2004/0090996 A1* | 5/2004 | Wu | H04N 21/658 |
| | | | 370/535 |
| 2005/0289618 A1 | 12/2005 | Hardin | |
| 2007/0064739 A1 | 3/2007 | Krishnamachari | |
| 2008/0101405 A1* | 5/2008 | Wirick | H04N 21/4347 |
| | | | 370/468 |
| 2009/0007199 A1 | 1/2009 | La Joie | |
| 2009/0135906 A1 | 5/2009 | Comer | |
| 2009/0232224 A1 | 9/2009 | Monaco | |
| 2010/0091888 A1* | 4/2010 | Nemiroff | H04N 21/4385 |
| | | | 375/240.28 |
| 2011/0197239 A1 | 8/2011 | Schlack | |
| 2012/0249869 A1* | 10/2012 | Tian | H04N 19/115 |
| | | | 348/388.1 |
| 2013/0191508 A1* | 7/2013 | Strasman | H04N 21/2385 |
| | | | 709/219 |
| 2013/0254341 A1 | 9/2013 | Ramakrishnan | |
| 2014/0112386 A1 | 4/2014 | Van Veldhuisen | |
| 2014/0126628 A1* | 5/2014 | Dikvall | H04N 19/103 |
| | | | 375/240.02 |
| 2015/0195589 A1 | 7/2015 | Jones | |
| 2015/0312601 A1 | 10/2015 | Novotny | |
| 2016/0255348 A1* | 9/2016 | Panchagnula | H04N 19/146 |
| | | | 375/240.02 |
| 2017/0223363 A1* | 8/2017 | Koteyar | H04N 19/159 |
| 2018/0262813 A1* | 9/2018 | Moorthy | H04N 21/23439 |
| 2018/0343295 A1 | 11/2018 | Botsford | |

\* cited by examiner

DYNAMIC QUALITY ADJUSTMENTS FOR MEDIA TRANSPORT

CROSS-REFERENCE TO RELATED APPLICATIONS

This application is a continuation of allowed U.S. application Ser. No. 15/906,673, filed Feb. 27, 2018, entitled "DYNAMIC QUALITY ADJUSTMENTS FOR MEDIA TRANSPORT" of which the full disclosure of this application is incorporated herein by reference for all purposes.

BACKGROUND

Users are increasingly obtaining content in digital format, often downloading or streaming that content from a remote service. The content will often be provided in a first format, such as a high resolution format, that will then be converted into various other formats appropriate for different devices or content streams. It will often be the case that a content provider will want some of the content to be provided in higher quality formats, while other content may be provided in lower quality formats. If the content provider produces the content in a different location than where the content is distributed, the provider will need to transport the content between those locations. The desire to keep certain content in high quality formats can prove challenging, however, as the individual channels will have quality constraints as members of the individual content pool. Using an approach such as conventional statistical time division multiplexing, however, makes it almost impossible to consistently provide as much bit rate budget as is needed to maintain the desired high quality levels.

BRIEF DESCRIPTION OF THE DRAWINGS

Various embodiments in accordance with the present disclosure will be described with reference to the drawings, in which.

DETAILED DESCRIPTION

Figure 1:
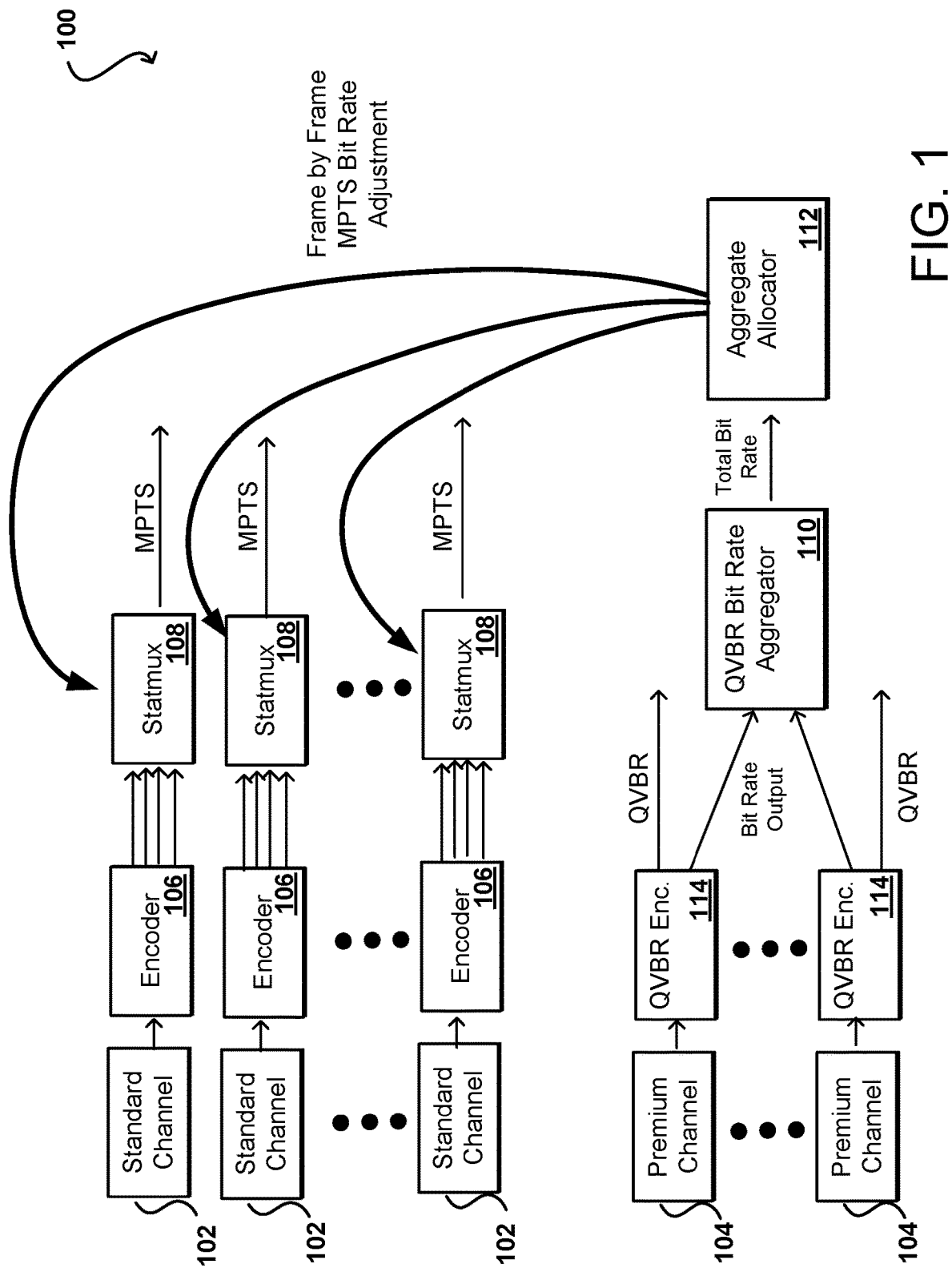
FIG. 1 illustrates an example system for performing dynamic bit rate adjustments that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the transportation and delivery of media content. In particular, various embodiments provide for the dynamic management of quality parameters, such as encoding bit rates, based at least in part upon the type of channel or content being encoded. A content provider might be responsible for content transmitted over a large number of channels, such as may involve hundreds of channels in some instances, which may include channels for which certain quality levels or values are important, referred to herein as premium or higher standard channels, and other channels where specific or minimum levels of quality may not be as important, referred to herein as standard or non-premium channels. Other transmission mechanisms can be included as well, such as content streams for live events. The provider might have a maximum bit rate specified (e.g., a maximum bit rate criterion of 2 GB over a period of time), such that the aggregate bit rate used to transmit content on the various channels should not exceed the maximum rate. The premium channels can be encoded using an encoding approach that allows for variable bit rates, but that also ensures a specified and/or minimum quality level is satisfied for the premium content. This encoding is not limited by the aggregate bandwidth or inclusion in a statmux pool or other such grouping. In at least some embodiments, the quality encoding enables the content provider to establish an operating point of fixed quality for the premium channels that enables that fixed quality to be available regardless of the content being delivered on other channels. The total bit rate used for the premium channels can then be determined, and compared against the maximum bit rate to determine a remaining bit rate for the current frame, period, or point in time. The remaining bit rate can then be allocated, evenly or otherwise, across the various non-premium channels, such as by evenly distributing the bit rates over a set of statmux controllers used for transporting the various non-premium channels. The statistical multipliers, or statmuxes, used for the non-premium channels can be configured to adjust the bit rates as necessary based at least in part upon the current allocation. Such an approach then enables the premium channels to receive the bit rate needed for their fixed quality settings, while ensuring that the aggregate bandwidth for all related channels do not exceed the bit rate limit for bulk transportation of the media content.

Various other such functions can be used as well within the scope of the various embodiments as would be apparent to one of ordinary skill in the art in light of the teachings and suggestions contained herein.

FIG. 1 illustrates components of an example content management system 100 that can be utilized in accordance with various embodiments. The content may include media content, such as video files, multimedia streams, and other media content, obtainable from one or more sources. In this example, the system may manage content for a plurality of different channels 102, streams, or other such sources or mechanisms for delivery or transporting content. The sources can provide content that may be encoded by various encoders 106, 114 to formats capable of being provided to various viewing devices for display, playback, or other such presentation. In various content delivery systems, such as for pay cable service, there may be many different channels, such as hundreds of different channels, for which content is available at all hours of every day. The delivery of this large variety of content can be made available using approaches such as statistical time division multiplexing (STDM or statmux), in which one or more communication channels are processed into one or more variable bit rate data streams. These can take the form of digital channels delivered to a set of cable boxes or other such devices. The approach provides for a large variety of channels over fixed bandwidth, but often at the cost of video quality in conventional delivery systems. The content delivered may often be at a lower bit rate than desired, which generally corresponds to a lower video quality, although various codecs or other techniques can be used to attempt to compensate for the lower bit rate. Variable bit rate can be used to produces improve video quality for a fixed bit rate. The correct bit rate for a media stream is typically a function of the playback device capabilities, network capabilities, and provider cost.

Content today is increasingly being delivered over connections of networks such as the Internet or a cellular network. Accordingly, computing or "cloud" resources are increasingly used to serve and manage the content. Various technologies have been utilized to attempt to limit the cost for bandwidth used to deliver or transport content. One such technology provides for limits or caps on video quality or video bit rate. Such an approach can accept a minimum quality level set by a content provider, for example, and cause the encoders to utilize the minimum number of bits needed to achieve that minimum quality level for any content delivered. Such an approach is not optimal for consumers of the content, as they are getting the lowest quality (meeting the minimum standard) at any given time. Further, the approach is not optimal for the provider as there is still little certainty as to the aggregate cost for providing the content with the varying bit rate.

In various instances, the content provider may also have to transport the content for these various channels from one destination to another. As mentioned, this may include transporting the content from a location where the content is produced, processed, or received to a location from which the content is to be distributed. For example, a large telecom provider might have two hundred fifty channels of live content that are to be moved from a production side, such as where the content is encoded or processed, to one or more distribution locations, such as at least one network edge-based content delivery network (CDN) location. The transmission may involve the aggregate channel lineup being sent across a fixed-size pipe, or other transmission mechanism with a maximum or fixed capacity. In order to maximize the number of channels included and available, the provider may utilize multiple statmux pools 108. Each statmux pool 108 can create an individual content stream, such as an MPTS (Multi Program Transport Stream), at a fixed bit rate contract. The aggregate value of the bit rate used by all the statmux pools can then be ensured to satisfy the fixed aggregate bit rate contract, such that the total amount of content transmitted across the network backbone, for example, does not exceed the contract amount. A potential downside with such an approach, however, is that even premium and high-complexity channels (hereinafter referred to as "premium channels") would have quality constraints as members of the individual statmux pools. It may be preferable, in at least some situations and for at least some providers, for the premium channels to be allocated as much bit rate budget as is needed to maintain the high video quality. Such allocation within a conventional statmux that is almost impossible to do consistently.

Accordingly, approaches in accordance with various embodiments provide for consistent bit rate allocation for specific channels, such as premium channels, to satisfy specified quality requirements, while also ensuring that the aggregate bit rate (or other such parameter) does not exceed the contracted, or maximum, amount, at least over a specified period of time. Such an approach can ensure that various other transmission criteria are satisfied as well as discussed and suggested elsewhere herein. In the two-hundred fifty channel example, the content may be a mix of at least premium channels 104 and standard channels 102 of lower complexity, for example, although there may be other classifications or sub-classifications of channels with different quality levels in other examples or embodiments. Instead of passing the premium channels 104, which may represent ten percent of the total content in one example, through the statmuxes 108, the premium channels can instead be run through a set of quality variable bit rate (QVBR) encoders 114 that are not in any statmux pool. The QVBR encoders 114 can define a bit rate cap per program, or other measure of content, but the frame-by-frame bit rate budget for the program will not be impacted due to participation in a statmux pool. Such an approach provides for scaling well beyond that of legacy statmux architectures.

In the example of FIG. 1, an application, process, or service can function as a QVBR bit rate aggregator 110, which can monitor the frame-by-frame bit rate of the aggregate pool of QVBR encoders 114. Other bit rate values can be monitored or utilized as well, as may relate to the GOP (group of pictures) by GOP bit rate output of all the channels that have been encoded in that QVBR section. The GOP for a channel refers to a collection of frames, or a subset of the channel or program content. The length of the GOP in some embodiments refers to the number of frames between two I-frames of compressed video. Other settings can be used as well, such as to adjust the bit rate settings every thirty or sixty seconds, among other such options. In at least some embodiments there may be no limitation placed on the codecs or formats used by the encoders. The QVBR bit rate aggregator 110 can obtain the bit rate information from the QVBR encoders 114, aggregate the bit rate data for a determined period of time or other such metric, such as for a frame of content or point in time, and can provide the total bit rate information to a component, process, or service such as an aggregate allocator 112. Since ten percent of the channels are premium channels in this example, the remaining ninety percent can be standard or "non-premium" channels that will each be a member of an assigned statmux pool 108. In this example there are multiple statmux controllers supporting this large sub-set of channels. The aggregate allocator 112 in some embodiments can function as a multi-statmux super-controller for the other statmuxes. The aggregate allocator can ensure that the fixed aggregate bit rate contract for the content is honored, met, or otherwise satisfied. In some embodiments, the aggregate allocator 112 can subtract, from the contracted budget, the frame-by-frame bit rate budget reported from the QVBR bit rate aggregator 110, although in some embodiments the aggregator and allocator may be part of the same application or service. The aggregate allocator can then allocate or distribute the remaining bit rate budget (for the frame or other metric) across the set of statmux controllers in the various statmux pools 108, and provide the respective budget portions to the individual statmux pools 108, although in some embodiments a statmux controller may receive the information for the various statmux pools, among other such options. An algorithm in accordance with one embodiment would divide the budget equally between each of the statmuxes 108, assuming that the corresponding standard channels 102 are all to receive equivalent treatment and are not of differing quality levels, etc. Such an approach enables the statmux portion of the system to function as in conventional approaches, dividing the available bit rate across the various channels. As mentioned, however, the allocation may be more complicated if there are channels of different quality, such as one statmux pool that consists of only 4K channels and another statmux pool that consists of only high definition (HD) channels, etc. A statmux controller can be configured to communicate with the aggregate allocator and adjust its local or individual bit rate contract on a frame-by-frame basis as instructed by the aggregate allocator 112.

Such an approach can be used to guarantee consistently high video quality (or other quality metric) for channels such as premium channels, while splitting the cost of maintaining the premium channel video quality across the majority of channels that are members of one or more statmux pools. Properly balanced, the cost of the premium channel video quality will be relatively unnoticeable as a drop in video quality for the standard channel lineup. The overall bit rate contract, for the aggregate content or backbone, etc., will be satisfied, and there will not be constraints, such as individual MPTS constraints, limiting the quality of the premium channel content.

In FIG. 1, the components illustrated can function as part of a network service (i.e., a cloud service or web service), as well as a conventional ground system or deployment. The QVBR encoders 114 can report frame-by-frame bit rate budget information to the QVBR bit rate aggregator, which may be part of a monitoring application or service. The QVBR bit rate aggregator can track the bit rate data for the various QVBR encoders 114, and can ensure that frame-by-frame budget reports are aligned. The aggregator 110 can also provide a frame-by-frame bit rate total for all QVBR-managed channels. The aggregate allocator 112, also referred to herein as a multi-statmux super-controller, can receive the frame-by-frame reported bit rate budget, divide it evenly (or arbitrarily or according to a distribution function) between each of the statmux controllers or statmux pools 108. The statmux controllers can operate on the baseline bit rate budget, but can adjust the budget frame-by-frame depending on the values received from the aggregate allocator 112. Such an approach can be applied to an entire channel lineup, encompassing multiple statmux controllers. The QVBR channels are not included in any statmux pool, thus being free to obtain the bandwidth needed (within any applicable constraints or limitations).

While other components may be used for the various non-premium channels, statmuxes are discussed herein because they can be used to dynamically modify the encoders for individual channels to adjust quality, typically by adjusting the bit rate used for the encoding. By processing a group of channels in a single statmux, the total bit rate to transport can be reduced with respect to what would be required were the channels processed individually. While approaches discussed herein can help to maximum overall quality while satisfying bit rate contracts, it can still be desirable to reduce bit rate requirements where possible in order to enable the maximum possible bit rate to be applied to the various channels under the contract, except where otherwise indicated or configured.

In at least some embodiments, QVBR components can be utilized that may operate similar to statmuxes but that allow for adjustments in bit rate while maintaining quality. QVBR components can be configured to maintain a fixed quality level, which is useful for premium channels and other high quality or high complexity content. Traditional statmux components can be used for the remaining channels, where consistent video quality may not be as critical. The statmuxes can be configured to allow for variations in the total available budget, such as on a frame-by-frame basis. This differs from traditional statmux architectures where there is a fixed bandwidth budget for the channels in the corresponding statmux pool. The configuration discussed herein enables the statmuxes to have a variable budget that is provided by a component such as the aggregate allocator, which obtains information regarding the bit rate usage by the QVBR channels. Traditional statmux behavior can be enforced, but with respect to the current bit rate budget or allocation for that statmux or statmux pool.

Such an approach also enables the premium channels to obtain additional bit rate as needed, individually or in aggregate. Statistically, the premium channels may be hitting a complexity peak across multiple channels, and the ability to obtain additional bit rate will prevent the quality from being compromised for the premium channels during the peak period. The additional bits can be taken from the aggregate pool of statmuxes that are carrying the regular channels. The statmuxes can then take the adjusted available bit rate budget and allocate that budget (evenly or according to a distribution function, etc.) across the various non-premium channels. For a large number of non-premium channels, and assuming the average or target bit rate budget for the premium channels was set reasonably, the variations should at most result in barely discernible differences in quality on the non-premium channels. In some embodiments the bit rate can be allocated according to a function, weighting, or various other criteria as well as discussed herein, such as may relate to the type of content, number of actual or anticipated viewers, etc.

In at least some embodiments there may be any number of channels allocated to a particular statmux. There may be different numbers of channels assigned to different statmuxes, and the number assigned can in some embodiments result from an attempt to evenly distribute the load across the number of available statmuxes. In some examples, there may be tens of channels per statmux, or as part of a particular statmux pool. A mapping component, which may be part of the aggregate allocator or a statmux controller, among other such options, can maintain an active mapping of the channels allocated to each statmux, and in some embodiments can move channel mappings to different statmuxes as the demand or number of available channels varies. Each statmux can then work to reduce the total bit rate budget of the channels in the respective statmux pool. As mentioned, the budget may be a fixed number based on the number of channels in a pool, or may be determined using a selected allocation function, among other such options. In one example, a statmux pool might typically have a 1.0 gigabit budget, but for a particular time period might be adjusted down to seven hundred megabits to be distributed across the various channels of the pool.

The premium channels 104 in one embodiment are individually encoded with a QVBR encoding algorithm. QVBR encoding algorithms may be similar to various VBR encoding algorithms, as may include multi-pass and single-pass encoding, fixed quality, bit rate range, and average bit rate algorithms, but provide consistent quality as discussed herein. As illustrated, the entire channel lineup, including the MPTS and QVBR streams, will be transported across the network backbone. It is this set of channels, including both premium and non-premium channels, that meets or satisfies the fixed bit rate contract in this example, such as by not exceeding two gigabits per second. The content provider may be a customer of the content management service who pays a certain amount based upon the amount of the fixed bit rate contract, such that the provider may wish to set a limit that will provide acceptable quality but does not significantly exceed the amount of bit rate needed during typical operation of the set of channels. Various other performance contracts can be enforced for the channels as well within the scope of the various embodiments.

In at least some embodiments, the content provider will make at least two choices with respect to the content transport. A first decision is a physical choice, which relates to the amount of money (or other compensation) that the provider is willing to pay for backbone transport for a particular period of time, or a particular amount of transport, etc. A second choice relates to the amount of quality that the provider wants to pay for on their premium channels. Since the complexity and other aspects of the content can vary over time, this will not be a fixed portion of the aggregate transport, and thus is accounted for separately, but can be used to determine the overall budget that may be appropriate for the set of channels. In most cases, providers will not want to pay more for the transport than is required, while satisfying the relevant quality contracts or requirements. In some embodiments a content provider might provide a minimum quality threshold, such as a minimum bit rate, to be used when encoding the various premium channels, as well as potentially other types of channels as discussed elsewhere herein. The quality criteria can be used to determine the number of bits used instantaneously for the set of premium channels. The remaining bits can then be spread or otherwise allocated across the various non-premium channels up to the total bit rate budget. In many instances virtually all of the bits available for the transport are going to be used. It is possible that in some instances, however, a contract might specify to utilize the minimum bit rate that enables all channels to satisfy their minimum quality criteria, while never exceeding the maximum aggregate bit rate, among other such options.

A variety of criteria, objective or subjective, can be used to determine which channels should be treated as premium channels and which channels should be treated as non-premium channels. Similar criteria can be used to set the quality settings for each. In some embodiments certain channels or certain providers will always correspond to premium channels, such as a channel that shows high resolution movies that are often of significant complexity. Other criteria may relate to a type of content, as may be included in metadata for a particular program or piece of content being broadcast or otherwise conveyed. As an example, sporting events with significant motion, which thus may have relatively high complexity, might be determined to be premium content, at least for certain types of sports or events. Picture complexity does not always translate to motion, but can also relate to a very large amount of detail, such as for very high resolution nature documentaries and other such content. In some embodiments the premium channels can be categorized into various categories and sub-categories, which may each have a different or respective quality setting, among other such options. In some embodiments the standard or non-premium channels can be categorized in a similar fashion, with potentially different quality settings for different categories, etc.

In some embodiments the quality setting for a particular channel may also be dynamically adjustable, whether through automatic or manual determinations. For example, there may be a large audience tuning into a particular channel, or the type or complexity of content being transmitted may change, among other such options. Accordingly, the QVBR setting for that channel may be able to be adjusted during the broadcast. The bit rate aggregator can detect the increase in bit rate for that channel, and can adjust the budgets for the non-premium channels accordingly. Such a process can also be used to adjust the QVBR settings for different programs or instances of content broadcast at different times over the same channel.

In some embodiments the fixed rate contract may not specify a hard cap that may never be exceeded, but may express a maximum amount over a given period of time, or an average not to be exceeded, etc. In any of these options, it can still be desirable to minimize any overage to the extent possible, at least as long as the various quality requirements are being satisfied. If quality settings are unable to be met under the current contract, then a recommendation can be made to the customer to change to a different contract or maximum value. In some embodiments there may be tiers of values and pricing, and such situations may trigger the customer to be moved up or down to a more relevant tier based on determined and/or predicted usage.

Figure 2:
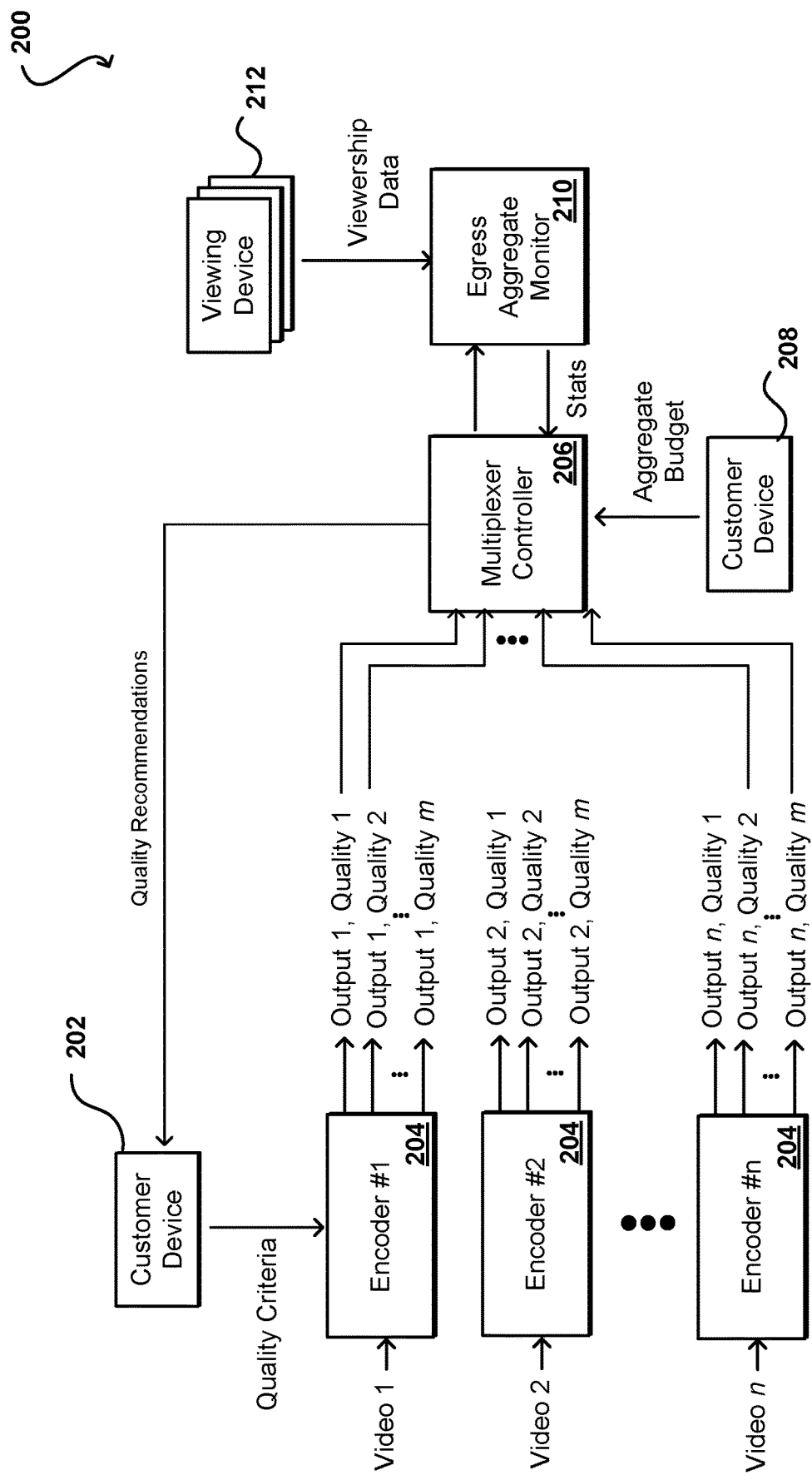
FIG. 2 illustrates an example media delivery system that can be utilized in accordance with various embodiments.

FIG. 2 illustrates an example content delivery system 200 that can be used to deliver content of different quality levels to a variety of viewing devices 212. The viewing devices can be any appropriate devices used to display or present media content, as may relate to notebook computers, tablets, smartphones, set top boxes, smart televisions, heads up displays, wearable computers, and the like. Various video files, streams, and other media content can be obtained that are to be encoded by various encoders 204 to formats capable of being transmitted to the respective viewing devices 212 for display, playback, or other presentation.

Content today is increasingly being delivered over connections of networks such as the Internet or a cellular network. Accordingly, computing or "cloud" resources are increasingly used to serve and manage the content. Various technologies have been utilized to attempt to limit the cost for "egress" bandwidth, or bandwidth for content that generally is being delivered to third party devices for consumption. One such technology provides for limits or caps on video quality or video bit rate. Such an approach can accept a minimum quality level set by a content provider, for example, and cause the encoders to utilize the minimum number of bits needed to achieve that minimum quality level for any content delivered. Such an approach is not optimal for consumers of the content, as they are getting the lowest quality (meeting the minimum standard) at any given time. Further, the approach is not optimal for the provider as there is still little certainty as to the aggregate cost for providing the content with the varying bit rate.

In some embodiments, a content provider can set one or more limits or targets for use in delivering content. This can include, for example, a monthly egress bandwidth, such as a budget of $100,000 per month at most, or a maximum egress bit rate threshold, whereby the bit rate might not be able to exceed 500 Mbps, among other such options. There may be various reasons for such limits, such as may relate to a bit rate contract with a network service provider or a limit of a collocated IP switch, among other such factors. The usage can be monitored and new limits suggested as well within the scope of various embodiments.

FIG. 2 illustrates example components that can be used to determine and enforce such limits. These include an egress aggregate monitor (EAM) 210, as well as a multiplexer controller 206, such as a MUX Gen-2 controller. The system can also include various encoders 204, as may be part of a single transcoding system. The encoders 204 in some embodiments can utilize a capped quality algorithm or capped variable bit rate (VBR) algorithm, among other such options. In this example, the EAM 210 can reside at the edge of a content delivery network, such as is discussed in more detail with respect to FIG. 5. The EAM can obtain information regarding a full channel lineup or offering, as well as information about the monthly billing cycle, the cap on the monthly budget, and the algorithm for calculating month-to-date aggregate spend, among other such options.

As an example, a customer might be halfway through a monthly billing cycle on day fifteen, and at the current egress rates the monthly bill is estimated to be $110,000, or 10% over the indicated budget. The EAM 210 can notify the multiplex controller 206 MG2 to reduce the capped video quality setting in order to attain an approximate 10% reduction in average bit rate. The analysis can be performed again, such as the next day, to determine whether the adjustment has put the provider back on track for the budget cap. The performance can be analyzed and settings updated at determined intervals or times, such as on a daily or hourly basis. It will often be the case that the adjustments are relatively small, and in some embodiments limits might be placed on the size of the adjustments. Small adjustments in general should not be perceptible by the average viewer, particularly for daily or monthly changes. A benefit to such an approach is that the system operator does not need to manually monitor performance, as the system is self-adjusting. If the content bandwidth is too high the video quality can be decreased as appropriate, and if the monthly budget is being underspent then the video quality can be increased unless otherwise specified by the relevant provider, etc.

In another example, a content provider might need to ensure that they do not exceed 500 Mbps instantaneous bandwidth on the egress. Accordingly, the various channels can be set to a capped VBR. Some of these channels might be set to a max of 5 Mbps while other channels are set to max of 8 Mbps. The average output bit rate might be 200 Mbps, where each of 100 channels averages 2 Mbps egress, but a simultaneous maximum peak across all channels might be between 500 Mbps and 800 Mbps. The EAM 210 can maintain aggregate thresholds that can be used to inform the multiplexer controller as to how to manage the corresponding encoders 204. For example, when the egress hits 350 Mbps a level 1 throttle can be triggered. The multiplexer controller 206 can notify the encoders 204 to reduce the maximum VBR from 5 Mbps and 8 Mbps to 4 Mbps and 6 Mbps, respectively. The rise in bit rate might slow, but remain increasing. At 425 Mbps the EAM 210 can notify the multiplexer controller 206 to apply a level 2 throttle. The mux controller 206 can then reconfigure the encoders 204 from 4 Mbps and 6 Mbps maximum VBR to 3 Mbps and 5 Mbps maximum VBR, respectively. As the egress bit rate surge decreases, the EAM can roll back the throttles until normal service is restored. A benefit to such an approach is that only the peaks are clipped, and only as critical thresholds are reached. The majority of time the content deployment will operate runs at or near maximum allowable quality, but rather than impacting all services with a catastrophic surge at egress, all services can see a graceful automatic reduction and restoral which should not significantly impact the consumer.

Such an approach enables customers of a content delivery system or service to meet their data egress budget and video quality targets, or not fall outside the respective limits, automatically and with maximum possible service to customers. Such an approach can prevent the need to manually monitor and/or adjust the bit rates or other quality parameters for various delivery channels, which can be impractical at best for customers with a large number of channels. A customer can use a customer device 202 to provide the quality criteria, such as the quality caps or targets, and this information can be provided to the relevant encoders 204 and other components of the system, such as the multiplexer controller 206 which can also provide quality adjustment (or setting) recommendations to the customer via the same or a different customer device 202. The customer can also use the same or a different customer device 208 to provide the aggregate egress budget information, as may be directed directly to the multiplexer controller 206 as in this example. The encoders can use a rate control model and a variable bit rate approach to determine the appropriate bit rates to use for specific channels. In the example of FIG. 2, each encoder 204 can receive an input video stream and can output multiple video streams or files with varying quality levels, which can then be delivered through the multiplexer controller 206 to the various viewing devices 212, such as through a content delivery network (CDN). The quality levels can be set according to the model, for example, and the encoders can automatically adjust the bit rate as appropriate, such as may be due to changes in the content of the input video stream.

In this example, the encoders 204 are not told ahead of time which bit rates to utilize, which can result in an unknown aggregate bit rate if not adjusted or managed. In order to monitor and adjust the actual usage, a component such as an egress aggregate monitor 210 (EAM) can receive viewership data from the various viewing devices 212, either directly or through a viewing data collection service or other such entity. The EAM can analyze the viewership data and generate aggregate data or statistics which can be provided to the multiplexer controller 206 in this example. The multiplexer controller can then automatically adjust the various quality levels used by the encoders 204, or can provide recommendations for adjustments to the customer. In some embodiments periods of throttling can be applied automatically, but significant adjustments to the quality levels or criteria can require customer approval. The model can also take into account factors such as day of the week or time of day, as the viewership patterns can vary by time or day, but can be relatively consistent for a particular type of time period. This information can be used to update the model over time, such as by using machine learning or another such approach. The viewership pattern information can be important in at least some embodiments because bit rates do not equate directly to egress costs, which can vary based at least in part upon the viewing pattern. The budget in at least some embodiments can then be set on the aggregate bandwidth instead of the egress costs. The EAM 210 in this example can track the bit rates and viewership for each video program provided to the various viewing devices 212 for purposes of adjusting the quality settings and/or updating the model, among other options discussed and suggested herein.

When consuming content, the various viewer devices 212 can have media players installed that are able to automatically detect network conditions, for example, and select the output option with the appropriate bit rate. As an example, a channel might have four streams available with bit rates of 5 Mbps, 3 Mbps, 1 Mbps, and 500 Kbps. The viewer can determine the current network conditions, such as by sending a ping or other such message, and the select that option that is most suitable for the current network connection. The viewership information to be analyzed can then include information such as the number of bits the encoder VBR is generating for each quality level or option, as each level can have a variable bit rate based on content. The viewership information can also include the number of devices receiving each of the streams of a particular quality level. The data is then aggregated at both channel and quality level, to determine the aggregate bit rate that has been used over a period of time. In some embodiments the level information can be obtained from the encoders, while the channel information can be built into, or received from, a viewership monitor. An aggregation table can be built and updated to indicate the number or percentage of viewers for each channel and quality level, which can then be combined with the bit rate data for each level to determine aggregate bit rate information. The aggregate bit rate information can then be analyzed with respect to the relevant period to project the anticipated bit rate usage, and adjust the values for the various quality levels for the channels accordingly. As mentioned, the balance can attempt to provide the highest quality video while still meeting the budget cap.

In the example system of FIG. 2, the encoders 204 implement a capped quality variable bit rate algorithm. The encoders generate the variable bit rates for the various target quality levels per settings provided by the customer. The encoders 204 can then output video for each respective quality level at the fluctuating bit rate. The encoded data then passes through the multiplexer controller 206, which performs the aggregation and monitoring of the bit rate sent for each level. The controller 206 can also store the bit rate data for subsequent analysis. The EAM 210 will receive the viewership data, determine patterns and statistics, then feed at least some of that information back to the controller 206. The controller can then call back and recommend a new quality level, such as to the encoders 104 for throttling or to the customer device 202 for longer term adjustments. A customer can accept or modify the recommended changes, as some channels may be higher priority and thus should not have quality decreases while others may allow for such adjustments. In many embodiments the quality level will relate to the bit rate. The differences between the levels may be such that an average human viewer may not be able to easily perceive the difference between adjacent levels.

In addition to separating weekdays from weekend days, there can be other separations that can be treated separately, such as by using different models. For example, there might be popup events where a special model or set of parameters might be applied, such as for a sporting championship game or other special event. Similarly, there might be seasonal models or models for specific holiday periods, among other such options. For various levels, this can impact the maximum bit rate or other thresholds or criteria applied to the various levels and/or channels.

Figure 3:
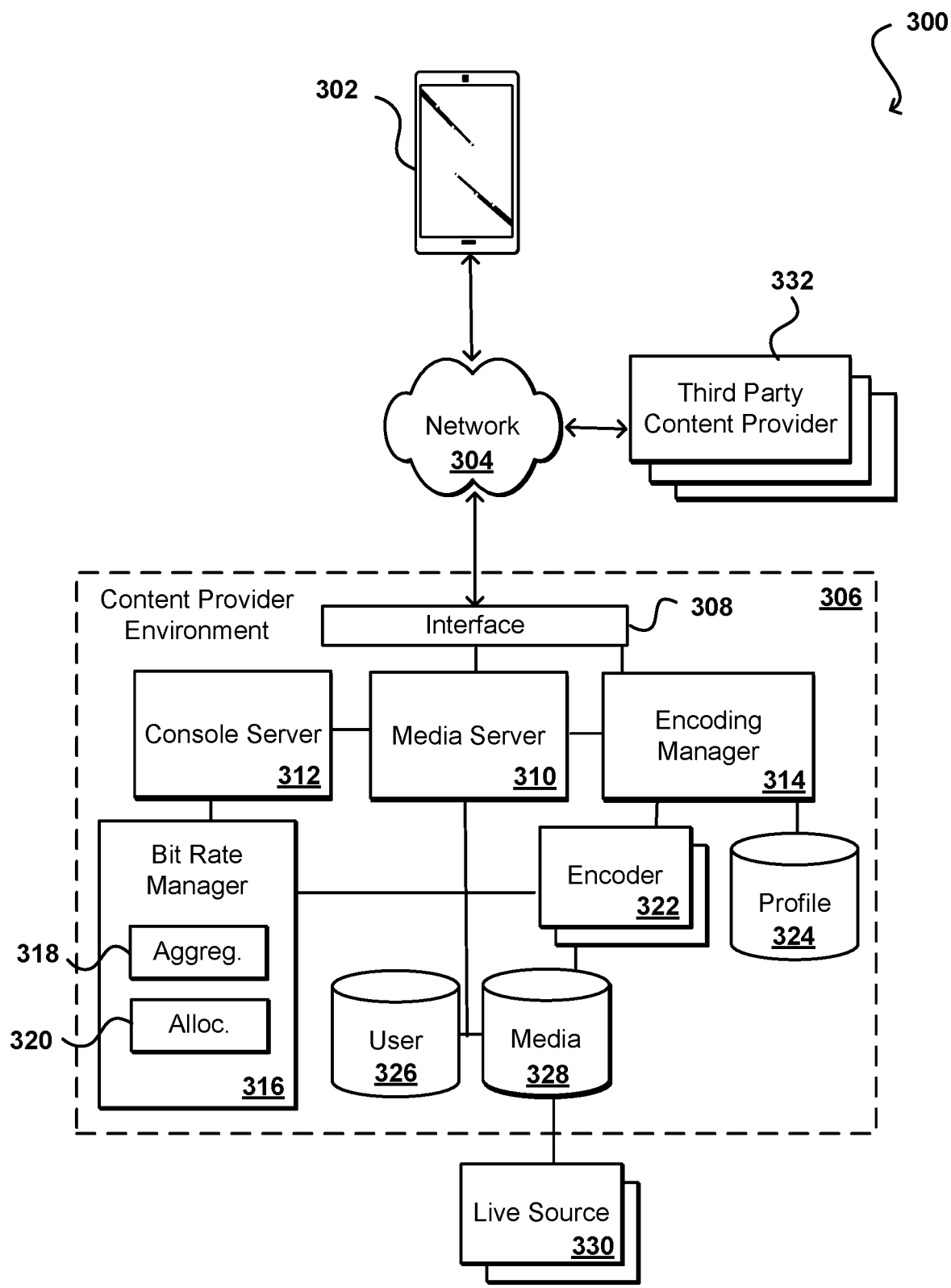
FIG. 3 illustrates an example media management service that can be utilized in accordance with various embodiments.

FIG. 3 illustrates an example content delivery system 300 that can be used to implement aspects of the various embodiments. In this example, a client computing device 302 can submit a request for content across at least one network 304 to be received by a content provider environment 306. This can include a request for specific content or a subscription to have content pushed to the client device 302, among other such options. In at least some embodiments the request can include a request for content to be displayed on, or presented via, the computing device 302, and in many cases will include audio, video, or other media content that is encoded for presentation by the client device 302. The network(s) can include any appropriate network, such as the Internet, a local area network (LAN), a cellular network, an Ethernet, or other such wired and/or wireless network. The content provider environment 306 can include any appropriate resources for providing content from a resource provider, as may include various servers, data stores, and other such components known or used for providing content from across a network (or from the "cloud"). As mentioned elsewhere herein, the client computing device 302 can be any appropriate computing or processing device, as may include a desktop or notebook computer, smartphone, tablet, wearable computer (i.e., smart watch, glasses, or contacts), set top box, or other such system or device. An interface layer 308, when receiving a request or call, can determine the type of call or request and cause information to be forwarded to the appropriate component or sub-system. For example, a request for content might be forwarded to a media server 310 while a request to specify encoding parameters or generate an encoding profile might be forwarded to a encoding manager 314 or console server 312, among other such options. These calls or requests can also come from third parties, such as streaming content providers who utilize the resources of the content provider environment 306, and third party providers 332 can provide at least some of the media content to be stored to a media repository 328 and/or encoded for display on the client device 302 as discussed herein. Further, a different type of client device 302 can be used to providing encoding information than is used to consume encoded content.

In this example, a call or request received to the content provider environment 306 can be received by an interface layer 308 of the environment. As known for network environments, the interface layer can include components such as interfaces (e.g., APIs), load balancers, request and/or data routers, and the like. If the request is a request for content, such as for a video data stream to be provided to the client device 302, information for the request can be directed to one or more media servers 310, which can obtain the content from a media data store 328 or other such repository or live media source 330 (or data cache temporarily storing media from the live media source) to be sent back across the network(s) 304 to the client device 302, which can be the device submitting the request or a device identified by the request, among other such options. In some embodiments, information for the request might also be compared against user data in a user data store 326 or other such location to determine, for example, whether the user has access rights to that content, and potentially the formats or versions to which the user has access rights.

In at least some embodiments a request from an operator, an administrator, a client device 302, a third party provider 332, or another such source might include a request to specify one or more sets of encoding parameters to be used with a media file. Accordingly, information regarding the encoding parameters can be provided to an encoding manager 314, or other such component or service, that is able to receive the information through an appropriate interface (i.e., an API or console) and cause the profile and parameter data to be stored to at least one appropriate repository 324 as discussed elsewhere herein. When a request for a video file is received, the encoding manager 314 can use the profile and parameter data to determine the appropriate encoding information, and can pass that to one or more encoders 322, such as may include encoding applications running on one or more allocated servers (physical or virtual), which can obtain the media file and encode the media file per the encoding information, which can then be provided to the client device by a media server 310 or other such component.

As mentioned, there are situations where the content to be transmitted to the client device 302 corresponds to a "live" stream. As referred to herein, a live stream refers to a transmission of media content that is received by the content provider environment during a period of capture, such that each frame of media content is received shortly after it is captured, for near real-time representation of an occurrence or event. This media data can be processed (i.e., encoded using appropriate encoding parameters) and then transmitted to the client device with minimal latency, such that the media data can be presented on the client device in near real time (i.e., less than a couple of seconds after the media data was initially captured). Approaches for capturing or displaying live broadcasts and streaming media are well known in the art and as such will not be discussed herein in detail.

For streaming media and other such content transmissions, various video encoding profiles or "presets" can be used that provide for granular control over the encoding parameters for the content to be transmitted. This level of control can require a complex, hierarchical, nested schema, along with an appropriate application programming interface (API) or other such interface, that are compatible with the encoding system. Any incompatibilities can result in a failed or incorrect encoding, which can prevent the media content from accurately being presented by the client device 302. In some conventional encoding systems an encoder appliance can be responsible for presenting, validating, and managing these encoding profiles. Such an architecture can present several challenges, however, such as how to manage these encoding profiles over the life of an encoder appliance that can have frequent changes to the core video encoding engine. For example, an encoding profile created for encoder version 1.0.0 might have a setting called "foo," which might be renamed or replaced for version 2.0.0 with a setting "bar." The version 2.0.0 encoder in this example would then have to maintain an upgrade path for any encoding profile that was created with version 1.0.0. For large numbers of versions and encoding profiles, this can quickly become difficult to manage and can have a high likelihood of error.

Accordingly, approaches in accordance with various embodiments provide a scalable architecture that is able to support current and future version of a media encoding engine. Such architecture can remove the complexity in conventional approaches which rely on the encoder to present and manage multiple encoding profiles. The architecture can provide a profile editor that is independent of any media encoder version, and that provides a normalized interface so that the end user (e.g., customers of the media service or content provider) can create and manage encoding profiles for any released version of the media encoder. In some embodiments, a profile editor can comprise a front-end application that is maintained outside the release cadence of the media editor. This can be a standalone application that customers install or a website accessed through a browser application, among other such options. The core logic for the profile editor can involve consuming a versioned schema, such as a JSON schema, that defines the available encoding settings to be presented to the user. A customer can use the editor to select, define, and/or modify the encoding settings for a profile. Once set, the profile editor can generate an output object, such as a data structure that can be in the form of a JSON object. The output is validated, and if valid can be versioned and written to persistent storage. This versioned output object will be used with the media encoder, in at least some embodiments, to encode corresponding live streaming events or other such content.

As mentioned, a customer can generate multiple profiles and there can be several customers associated with a media service. When combined with the number of encoder versions supported, the number of profiles and settings to manage can be quite large, particularly for enterprise-grade encoders. In conventional approaches, engineers often have to analyze and adjust the various encoding settings for each relevant profile. Encoder updates can be released relatively frequently in order to support new features, provide new settings, support new validations, and provide other such functionality. This can include, for example, supporting a new codec and the associated settings. By providing an architecture that supports such expansion without the need for users to update their software continually, the user experience is improved in addition to the reduction in resources otherwise needed to provide the additional or alternative functionality. Such an approach enables customer to fine tune settings without a need to upgrade, and customers can generate new profiles that are supported by the existing architecture. The architecture can ensure that any impact of the new settings is handled automatically and dynamically with minimal effort on the part of the customer or the provider.

As mentioned, it may be desired in at least some embodiments to adjust the bit rates used for various channels in order to satisfy one or more service contracts while maintaining video quality for at least premium channels or other identified content. As mentioned, a bit rate manager 316 can include a QVBR bit rate aggregator 318 and an aggregation allocator 320, among other such options, to determine the bit rate used for the premium channels, then allocate the remaining bit rate across the various non-premium channels. As mentioned, the adjustments can be made at any appropriate level of granularity, such as for every frame of video or at regular intervals, among other such options.

When determining an encoding profile for a media file, the possible values can be determined that are valid for the various primitives. As mentioned, this can include using a JSON schema, Swagger file, XML document, or other such approach to reflect the values. As an example, a customer can select a codec within the video settings. There may be dozens of codecs from which the user can select, and there may be some codecs that are not appropriate for this video stream or channel. The encoding settings module can be used to determine which codecs to provide as options to the customer through the console, as generated using the console server 312. The console service in this embodiment can be programmed to interact with various service endpoints across the content provider environment 306. The console server also is able to locate and serve up the static codebase, which can be pulled from a content delivery network (CDN) or other such location. The console server can obtain the schema modeling documents for generating the encoding profiles, and can generate the necessary information so that the relevant encoder can consume the corresponding profile. Once the customer selects a codec, such as the H.264 codec for high definition digital video, there will be various constraints on the remaining video encoding settings that correspond to the selected codec. An encoding settings module can consume the versioned schema in order to programmatically determine the relevant settings to then surface through the console. The module can also determine appropriate validation instructions for the attributes of the relevant fields. This can include, for example, validating a type of value presented for a field, such as whether the value is a number, string, or Boolean value, among other such options.

Such a system can provide dynamic quality level adjustments for various types of encoded media, such as for live streams or stored media files. The media itself can include audio, video, image, augmented reality, virtual reality, animation, or gaming content, among other such options. The video can be sent in a live stream, according to a broadcast schedule, or on demand, etc.

Figure 4:
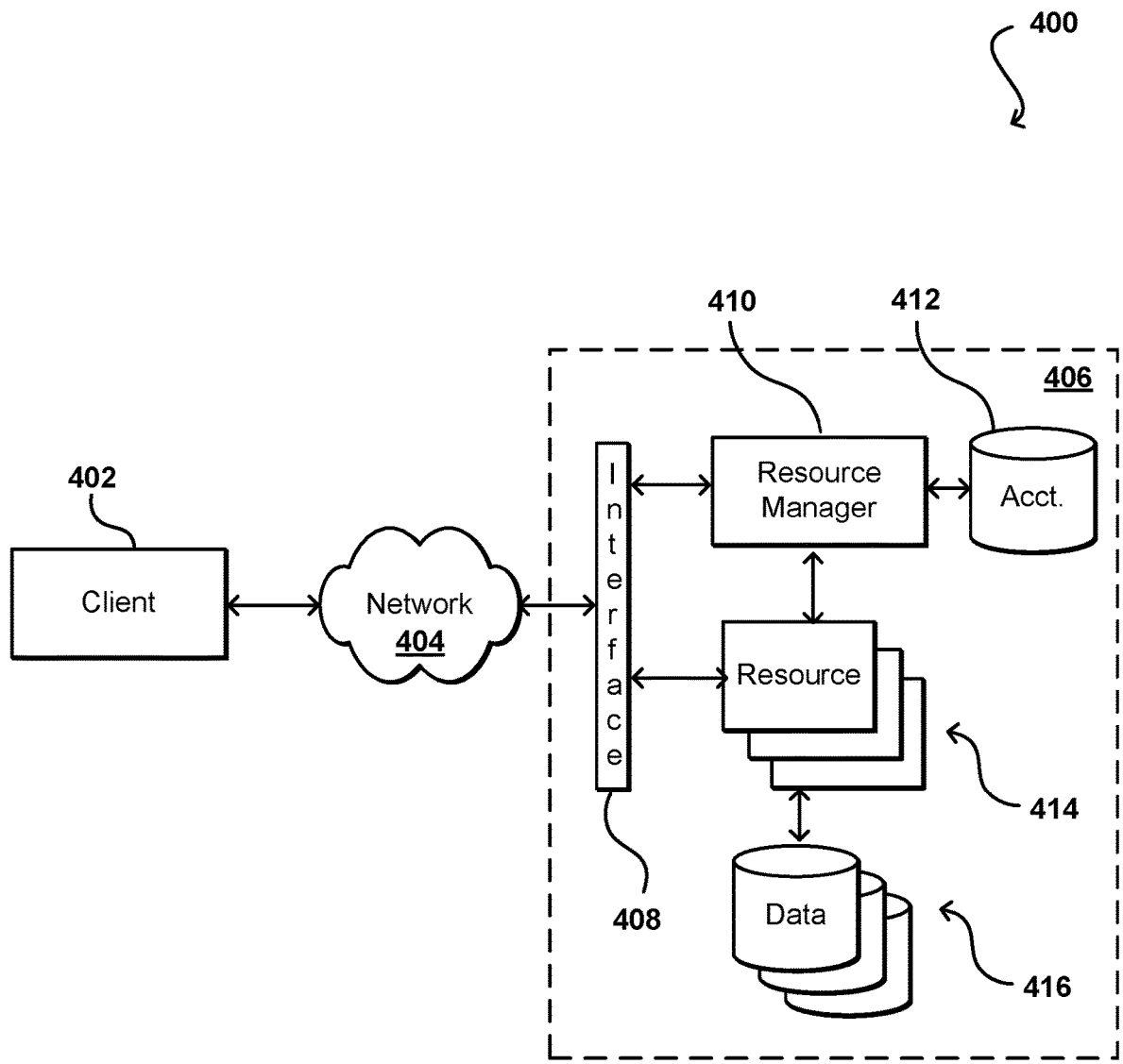
FIG. 4 illustrates an example system that can be used to provide resources for managing media content in accordance with various embodiments.

FIG. 4 illustrates an example environment 400 in which aspects of the various embodiments can be implemented. Such an environment can be used to allocate resources, or resource capacity, for purposes such as to encode or provide media content, among other such options. In this example a user is able to utilize a client device 402 to submit requests across at least one network 404 to a resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
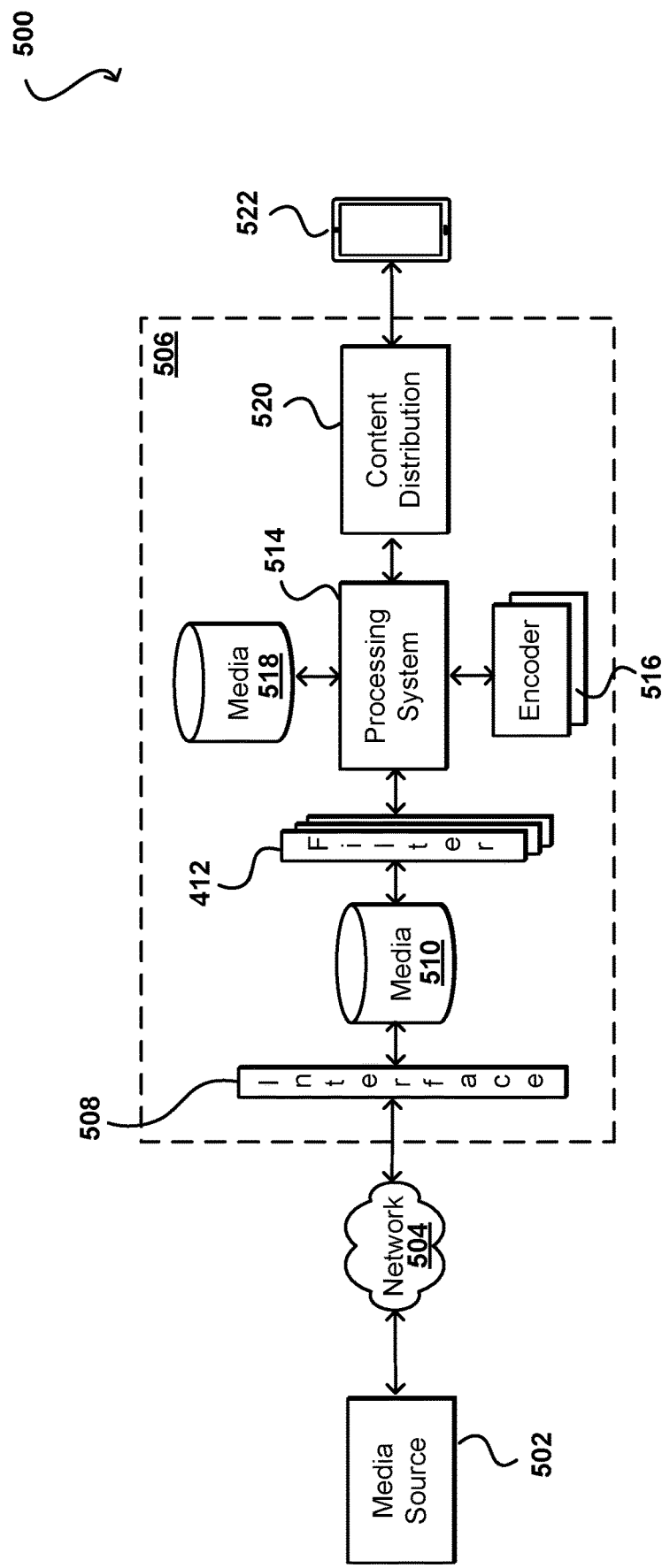
FIG. 5 illustrates an example media encoding system that can be utilized in accordance with various embodiments.

FIG. 5 illustrates an example system 500 that can be used to implement aspects of the various embodiments. In this example, one or more media sources 502 can upload media content over one or more networks 504 to be received to an interface layer 508 of a content provider environment 506. The content provider can be a shared resource environment, as discussed with respect to FIG. 4, or a dedicated network used by the content provider as part of a content service offering, among other such options. For live streaming options the media repository 510 may act as a cache or buffer, while for other options the repository might store the data until sufficient data has been received or an aggregation process in executed, etc.

In this example a processing system 514 can be tasked with analyzing, aggregating, or otherwise generating media content that can be output for display or other presentation on one or more client devices 522. The processing system can include various processing components such as host machines, virtual machines, and the like. The processing system 514, which can also be offered as a service from inside or external to the content provider environment, can obtain the media content from the media repository 510 and cause one or more filters 512 to be applied to the content. As mentioned, the filters can attempt to remove any content that does not satisfy specific criteria, rules, or policies. For example, filters might remove from consideration any files that are not of a specified format, resolution, minimum or maximum length, size range, orientation, or time period. Other filters might be used as well that might not remove the clips from consideration but might be used to rank those clips for potential selection, such as may include sharpness, blurriness, brightness, contrast, view, capture location, or amount of movement for video content, as well as volume, background noise, and dynamic range for audio content. Various other filters can be applied as well as discussed and suggested elsewhere herein. Further, at least some of these filters can be applied on the media sources 502 before upload. These filters can analyze the captured media content and analyze the content before uploading, or can potentially apply the filters before the capture of the content. For example, if a certain format or orientation is required and an attempt is made to capture and upload content with a different format or orientation, then an application on the device might notify the user before capture that the content does not satisfy the relevant criteria, such that the user can make any appropriate adjustments. In some instances the content adjustments might be made automatically, such as to capture in an appropriate format or resize to a specified size, while other adjustment might need to be made manually, such as to capture with a certain device orientation or adjust the amount of ambient lighting, etc.

The processing system 514 can receive or obtain the video content after the filtering and analyze the media content to determine which audio, video, text, or other content to include in the file or stream. The processing system can cause the content to be converted to at least one appropriate media file, for example, using various encoders 516, transcoders, processing algorithms, or other such components, systems, or services. In at least some embodiments, metadata can be written to the output file using the appropriate settings as discussed herein. The produced media can be written to the same media repository 510 or a different media repository 518, which can store the content for subsequent access or buffer the content for live streaming, among other such options.

When the content is to be provided for presentation via a client device 522 or other such system, a content distribution system 520, service, or network can obtain the appropriate data from the repository 518 and cause that content to be provided to the client device 522. In some embodiments, the client device 522 can have the ability to change the feed, stream, or file being received, such as by sending a request to the content distribution system 520 for a new stream, feed, or file. There may also be different versions of the stream, such as may have different sizes, qualities, or formats, from which a viewer can choose. The client device can also potentially upload content related to the media through the interface layer 508 for potential inclusion in subsequent portions, streams, feeds, or files for the content.

Figure 6:
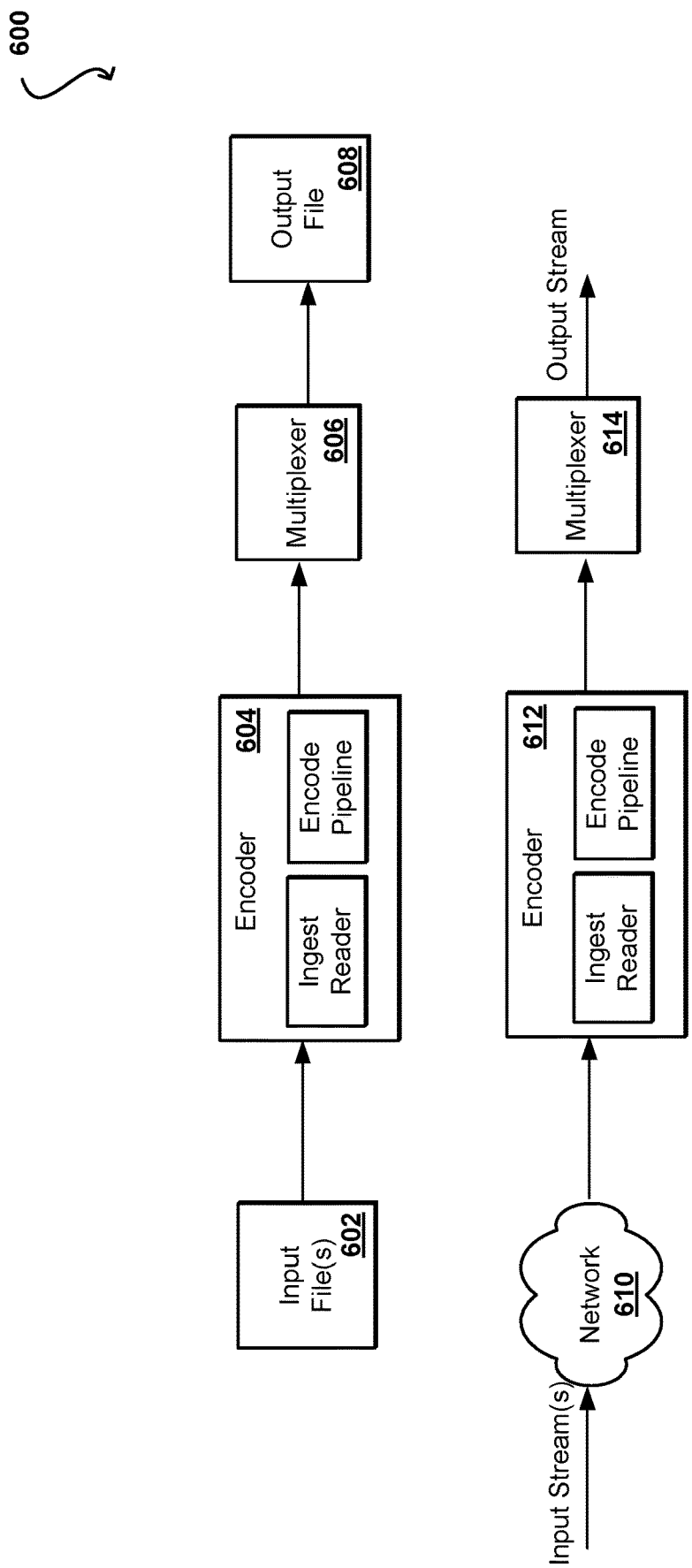
FIG. 6 illustrates components of an example media encoding system that can be utilized in accordance with various embodiments.

In some embodiments the encoding subsystem includes one or more encoders, a set of bitstreams (or video signals), and a content delivery network. Various encoders 604, 612 are illustrated in the example configuration 600 of FIG. 6. The one or more encoders can include both encoders and packagers, which can be implemented via an origin server. A packager can receive a signal (e.g., feed), such as a video signal, a media input file 602, or a live stream over at least one network 610. In this example there is an encoder 604 for the input media files and an encoder 612 for the input streams, with each having a respective multiplexer 606, 614, or sharing a multiplexer, for generating the output file 608 or stream. A live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to a content delivery network (CDN). The bitstreams can represent various encoded/packaged versions of the signal feed, as may be encoded per the encoding parameters from the encoding manager. For example, the bitstream may be a high resolution and/or high bit rate version of the signal feed. In some embodiments, different bitstreams may provide alternate audio (e.g., different languages) and/or closed captions. The number and/or types of the bitstreams may be varied per the profile or other data.

Each of the bitstreams generated in such an embodiment can comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bit rate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/ updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time).

Various media encoders or transcoders can monitor a set of SDI inputs for information such as video format, audio format (i.e., pulse code modulation (PCM) audio format, Dolby Digital audio, Dolby Digital Plus, DolbyE, etc.), audio levels, resolution, frame rate, and timecodes, while being able to concurrently use those inputs to provide media to one or more transcoding pipelines. Other input types, such as asynchronous serial interfaces (ASIs) or high-definition multimedia inputs (HDMIs), can be monitored using such processes as well. As mentioned, the media content obtained by such a system can be provided from any of a number of different sources. For example, content might be obtained from a production company or third party provider.

In some embodiments, a monitoring system can be placed by the egress of the aggregate output of all encoders. It can be a logically separate function from the encoders, and can be located at a separate physical location. The bandwidth threshold notification can be made more robust via use of a heartbeat mechanism between the monitor and the encoders. It might be the case that encoders operate in a default state wherein they observe the mathematical cap and minimum quality. The monitoring system can notify the encoders, or encoding monitor, that the quality can be increased. The service can continue at minimum quality level. If the heartbeat is active, and no acknowledgement is received from the encoders, the monitoring system can resend the notice. If the heartbeat is inactive, the monitoring system can send an alarm for operator intervention. The encoders can remain at a minimum quality setting. If the encoders instead operate in a maximum quality state, not at the default mathematical cap, the monitoring system can notify the encoders (or encoder manager) that the quality must be decreased in at least some embodiments. The service can continue at the maximum quality level. If the heartbeat is active, and no acknowledgement is received from the encoders, the monitoring system can resend the notice. If the heartbeat is inactive, the monitoring system can send an alarm for operator intervention. If the heartbeat is inactive, the encoders can revert to a default state, such as a mathematical cap.

Figure 7:
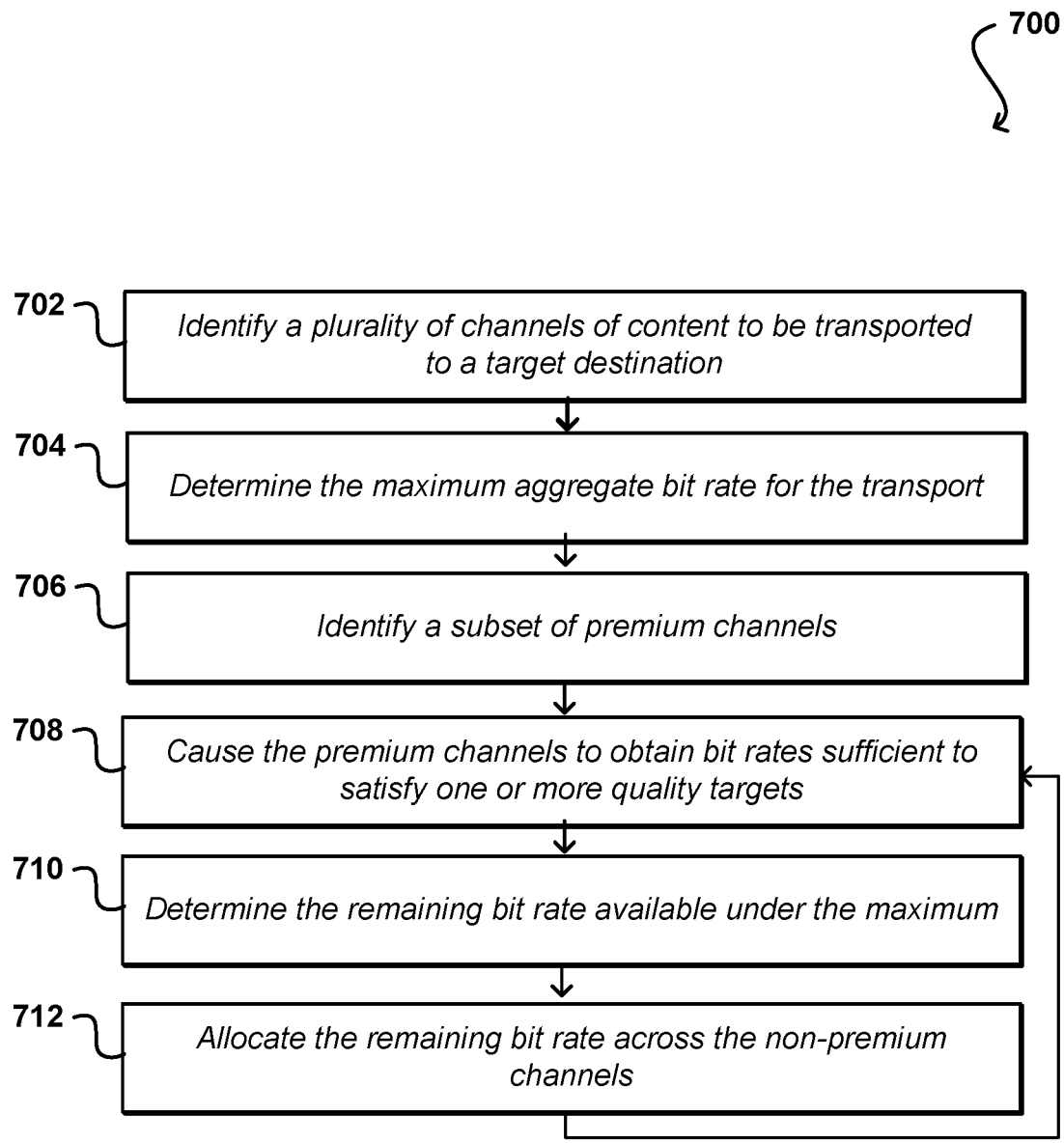
FIG. 7 illustrates an example process for maintaining quality for a subset of channels under a maximum aggregate bit rate constraint that can be utilized in accordance with various embodiments.

FIG. 7 illustrates an example process 700 for managing bit rate for a plurality of content channels that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a plurality of channels of content are identified 702 that include media content, such as may include video content, to be transported to at least one target destination. As mentioned, this might be the case for a content provider who produces content for multiple channels that then needs to be transported to a distribution location, among other such options. In many instances the provider will have specified a maximum cost or amount or resources to be used for the transport. This can include, for example, a maximum instantaneous total bit rate that is not to be exceeded for the transport of content for the channels in aggregate.

The set of channels can include channels of at least two types or categorizations, such as premium channels and non-premium channels. As discussed herein, premium channels may include content that is to be allocated sufficient bandwidth to enable at least a minimum amount of quality (as may relate to resolution, compression, etc.) to be maintained, and in some instances may enable the premium channels to utilize as much bit rate as is needed, such as for a current frame or period of time. The set of premium channels can be identified 706. The set may be fixed over at least a period of time, or may vary based on factors such as the type of day or type of content being transmitted. The premium channels, and more precisely the encoders for the premium channels in at least some embodiments, can be caused 708 to obtain bit rates, whether the same for all premium channels or as needed for individual premium channels, sufficient to satisfy one or more quality targets. As mentioned, this can include any bit rate (except maybe under a maximum overall threshold) required by the encoder, or any bit rate that enables the video content to be encoded with at most a maximum amount of compression, at least a minimum resolution, or another such aspect. The remaining bit rate under the maximum, once removing the bit rate allocated to the premium channels, can be determined 710. This remaining amount, or an amount of bit rate of at most this amount, can then be allocated 712 across the remaining, non-premium channels. As mentioned, the bit rate can be allocated equally, substantially equally, or unequally according to a distribution function or other such approach. As mentioned, the adjustments can be made as often as possible, such as where the determinations are made for each frame, every set of frames, at regular intervals, or for any other determined criterion.

Figure 8:
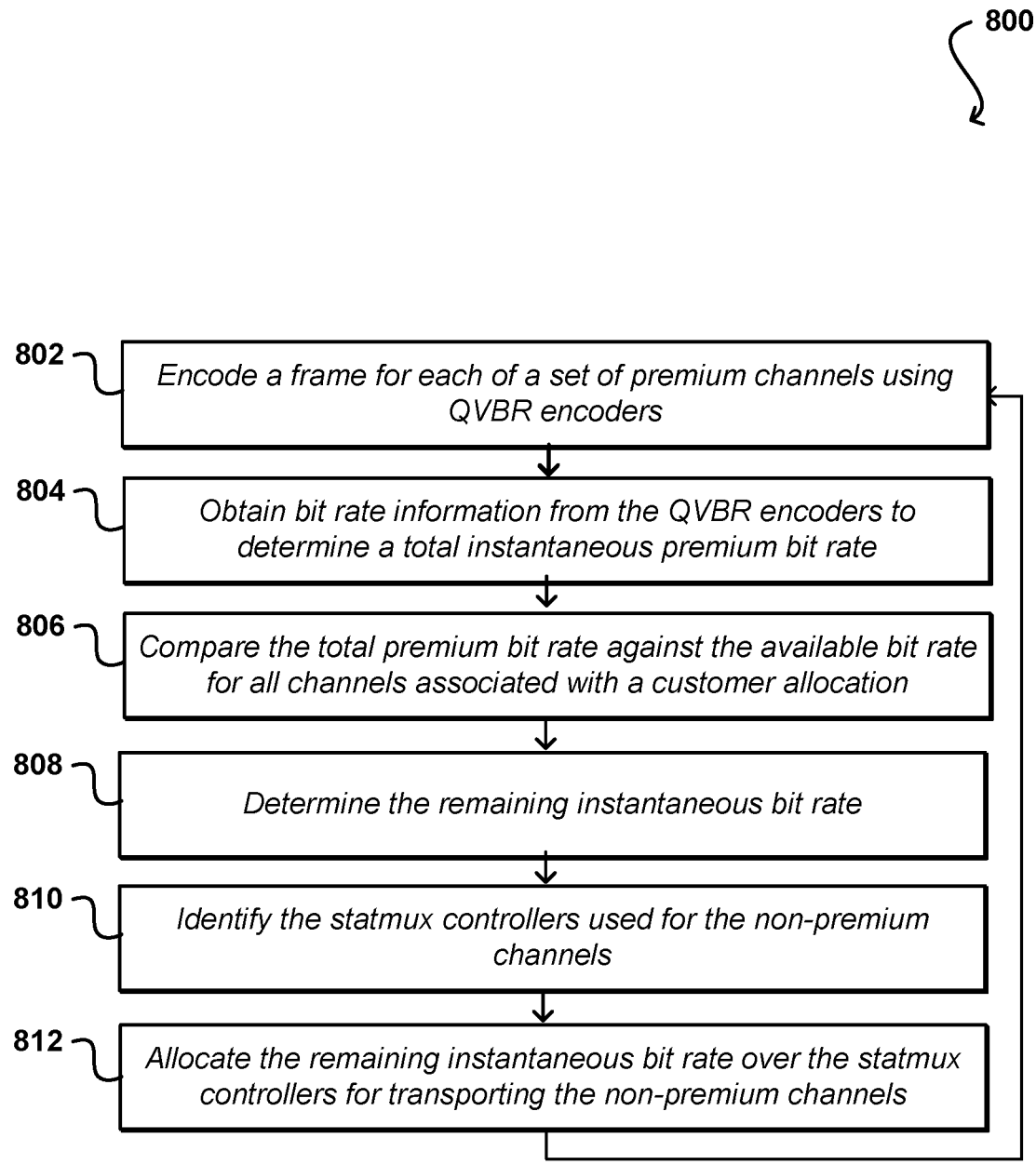
FIG. 8 illustrates an example process for allocating instantaneous bit rate across a set of channels that can be utilized in accordance with various embodiments.

FIG. 8 illustrates an example process 800 for determining an instantaneous bit rate to be used for a set of media channels that can be utilized in accordance with various embodiments. In this example, bit rate (and potentially other) determinations are made on a frame-by-frame basis. As mentioned, however, adjustments may be made at any other appropriate times or intervals, or in response to various occurrences or criteria, within the scope of the various embodiments. In a frame-by-frame example, the current frame (such as the frame to currently be encoded for a live stream) for each of a set of premium channels can be encoded 802, such as by using a QVBR encoder or other such encoding mechanism that is able to allow for variable bit rate while retaining a specified or minimum quality level or target, etc. As mentioned, each QVBR encoder can define a respective bit rate cap that is appropriate for the content at any given time, and this budget will not be impacted by participation in a statmux pool or another such limitation. The bit rate used can thus vary between the premium channels based upon factors such as the complexity or type of content being transmitted for those channels. The bit rate can also vary between frames for a given channel or program of content based upon similar changes in complexity or other such factors.

The bit rate data from the various QVBR encoders, which as mentioned can be separate instances of the same encoder in some embodiments, can be obtained 804 by a component or service such as a bit rate aggregator. The aggregated premium bit rate data can be used to determine a total instantaneous premium bit rate for a current frame, point in time, or period of time, etc. The total premium bit rate can then be compared 806 against the available bit rate for all channels associated with the group of channels or customer allocation. As mentioned, a customer may pay for up to a maximum bit rate for all the channels in aggregate, so the bit rate available for the non-premium (or other) channels can be determined based on the difference between what is available under the customer account and what is used for the premium channels. A component or service such as an aggregate allocator can then determine 808 the remaining instantaneous bit rate that can be used for the non-premium channels for the relevant time, point, frame, or period. The remaining bit rate can then be spread across the remaining non-premium channels. In this example the non-premium channels are processed using a series of statmuxes, and the process can involve identifying 810 the statmux controllers used to process the non-premium channels. As mentioned, there may be a fixed number of statmuxes or a number that varies based at least in part upon the number of channels broadcasting or otherwise transmitting content at a particular time or period. In some embodiments the number of statmux controllers is determined, such as where the remaining bit rate is to be allocated evenly across the various statmuxes. Once the statmux controllers are identified, the remaining instantaneous bit rate can be allocated 812 over the number of statmux controllers for transporting the content for the non-premium channels. Each statmux controller may have a respective set of channels allocated, which are referred to herein as statmux pools. In many embodiments, the sizes of the statmux pools can be relatively equivalent such that the bit rate can be allocated evenly across the pools. As mentioned, in some embodiments the bit rates may not be allocated evenly but according to a determined allocation function, which can take into account factors such as the type of channel, type of content, and other such factors. Further, in some embodiments certain statmux pools may carry specific types of content or channels, such as channels with a given range of video complexity, or the channels may be assigned to attempt to even out the bit rate demands for channels assigned to a given statmux pool, among other such options. Different weightings may be applied to the various statmux controllers for use with the distribution function, where the weightings are based at least in part upon aspects such as the size and complexity as discussed herein.

Figure 9:
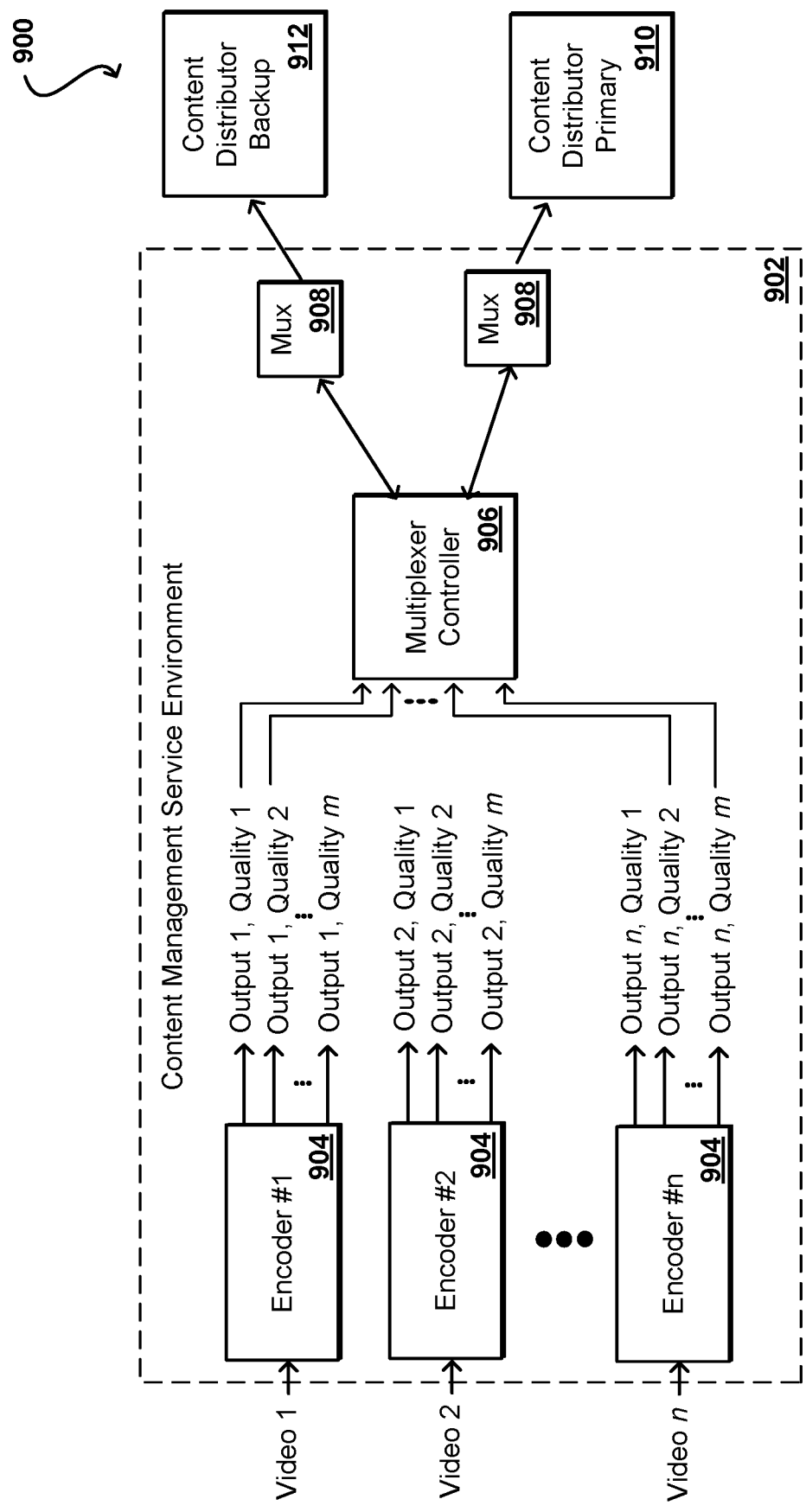
FIG. 9 illustrates components of another example media encoding system that can be utilized in accordance with various embodiments.

As mentioned, budgets, caps, or targets other than maximum bandwidth costs can be applied within the scope of the various embodiments. For example, consider the system implementation 900 illustrated in FIG. 9. In this example, as with the example of FIG. 1, multiple video inputs are received that are encoded using a set of encoders 904. In this example, the encoders 904 are illustrated to be part of a content management service environment 902, such as the provider environment discussed with respect to FIG. 5. In this example, there may be dozens or hundreds of channels available for a customer, in this case a content distributor such as a pay television operator, where each channel can be encoded at different quality levels. In this example, however the content is not provided directly to the end viewers, who can have devices that pull at varying rates, but instead is provided to a single primary content distributor system 910. It might be the case, such as in this example, where a duplicate stream is provided to a backup system 912 for the content distributor, among other such options. While such an approach may not need to manage the selections of various client devices with respect to quality selections, the large number of channels of varying content, when used with variable bit rate encoding, can still provide for large swings in egress bandwidth usage.

For a customer such as a content distributor, the customer might put into place a maximum instantaneous egress bandwidth cap. This can be for a number of reasons, such as to manage cost but also to prevent significant degradation in content quality during periods of heavy usage. For example, a hard bandwidth cap can be implemented to prevent random errors from being introduced in any of the video channels for the distributor. In this example there are multiplexers 908 at the edge of the content management service environment 902. The multiplexers 908 can provide instant feedback about the egress bandwidth being provided to the system. This information can be fed back to the multiplexer controller 906, for example, which can compare the instantaneous egress bandwidth to the respective bandwidth cap. It may be determined that the instantaneous bandwidth is approaching the cap, such as by the bandwidth hitting a threshold value or percentage of the cap. In such a situation, the multiplexer controller can instruct the encoders 904 (or an encoder manager, etc.) to adjust the bit rate used for one or more of the channels or quality levels, in order to attempt to throttle or reduce the usage at least until such time as the instantaneous bandwidth falls back to a more reasonable number that is not near the bandwidth cap.

The monitoring of the instantaneous bandwidth at the network edge provides accurate egress bandwidth data, which can be used to determine a proximity to a relevant bandwidth cap. A customer can utilize various approaches, as discussed elsewhere herein, to prevent excessive bandwidth usage. For example, the customer might have a first set of settings to use under normal conditions, but a second set of settings to use when the instantaneous bandwidth is nearing the bandwidth cap. A first set or version of encoding settings can utilize minimum and average bandwidth settings for a lowest and middle quality level. A highest quality level for the first set is a maximum video quality setting. A second set of encoding settings might use the same low and middle quality level numbers or caps, but utilize a different maximum bit rate value, such as for a maximum per a mathematical guarantee. A multiplexer function at the egress point can make frequent decisions for each channel, potentially down to specific frames or on a frame-by-frame basis, such as may involve an output locking mechanism. Thus, the system in some embodiments can fluctuate back and forth between the two sets dynamically based on the current egress bandwidth. In other embodiments the system will make aggregate determinations that will be applied concurrently to multiple channels, such as non-premium channels, in response to the aggregate egress bandwidth approaching the cap or meeting another such threshold or criterion. By analyzing on a frequent or frame-by-frame basis, it can be virtually guaranteed that the cap will not be exceeded even in the case of severe instantaneous spikes in complexity among many or all of the channels. Other methods can be used as well, which can vary for packaged or non-packaged approaches. For a non-packaged approach, the analysis can be performed in a granularity of one to two seconds, or GOPs, instead of frame-by-frame. The approach could generally be the same, with the encoder telling the multiplexer the appropriate switch points in at least some embodiments.

As mentioned, such an approach can provide a fail-safe mechanism whereby multiple variable bit rate media channels, such as may stream live video, can be delivered over a fixed (or maximum) egress path with a guarantee that there will be no appreciable bandwidth overflow. As mentioned, the bandwidth can be pooled and/or analyzed in aggregate in at least some embodiments. Each channel encoder can output a set of streams for a respective channel, where one stream or output can have a maximum bit rate set for best quality and one stream or output can have a maximum bit rate set to a mathematically determined cap, such as may relate to the aggregate bandwidth for a provider divided by the number of channels. Using such an approach, if the aggregate egress bandwidth is approaching the cap then the guaranteed cap set can be used such that no channel is using more than its portion of the bandwidth. While there may be premium or other channels where higher quality may be desired, if each channel is set to use at most its apportioned share of the bandwidth then it can be guaranteed that there will be no excess bandwidth usage while all the channels are utilizing (at most) that maximum bit rate. The system can maintain and utilize a manifest describing the various output stream segments, which can include information such as the quality levels and locations from which the segments can be retrieved.

As mentioned, a multiplexer can monitor the instantaneous bit rate generated by the channel encoders for each segment. The aggregate bandwidth can be analyzed, and if the sum of the channel output stream bit rates exceeds the bandwidth cap, or maximum aggregated instantaneous egress bandwidth, the multiplexer can update the manifests such that a sufficient number or selection of channels can only utilize up to the guaranteed cap quality level, whereby the aggregate output bandwidth should at most equal the bandwidth cap, and any channel operating at less than the maximum bit rate will cause the aggregate usage to be below the cap. In at least some embodiments the bandwidth aggregation function can utilize a customizable windowing function to tailor the values to the different egress network characteristics. The actual caps for each of these levels can be varied as discussed elsewhere herein, such as where the best video stream quality cap values are updated by the egress monitor, or another such component or system, for optimal aggregate long-term period cost and/or quality. There can also be more than two streams per channel in at least some embodiments, therein the multiplexer can select between the different streams as long as the aggregate bandwidth is less than the cap amount, whereby the selections available may become more limited.

Such monitoring can also allow for the throttling or stepped mitigation of increased bandwidth usage. A stepped mitigation system or throttling mechanism can help to minimize, but not guarantee in at least some embodiments, instances where the bandwidth cap is exceeded. For example, each channel can have streams or outputs of different quality levels as discussed herein. The output for each channel from an encoder can be a variable bit rate output, with settings that might include a minimum, average, and maximum video quality setting. The maximum setting value can provide for the highest quality and highest bit rate for the output media. If all channels are operating at the maximum output, however, the bandwidth cap might be violated, at least for certain periods of time. The system can then set one or more thresholds below the cap such that mitigation begins before the cap is exceeded. While large spikes in instantaneous egress bandwidth will be rare, there may still be situations where such an approach may not prevent excessive bandwidth usage, but can reduce and minimize the excess usage.

In this example, the encoding system can begin to take preventative or remedial action when the bandwidth for a customer begins to approach the bandwidth cap. In this example, the maximum bit rate setting can be temporarily reduced for at least some of the channels, such as channels that are not designated as premium or higher standard channels. In some embodiments any or all channels can have their maximum bit rate adjusted. The maximum bit rate of at least the non-premium channels can be reduced using the warning threshold is relieved, such as where the bandwidth is back below the warning threshold. As the usage falls off to normal levels, the bit rate values can be increased or restored. In some embodiments the values can be dynamically adjusted as appropriate in order to provide the maximum video quality for the various channels as long as the aggregate instantaneous bandwidth does not approach, meet, or exceed the specified cap. In some embodiments the bit rate or video quality can be reduced such that the cap is never exceeded, but in some embodiments there will be minimum quality requirements for content delivery that may conflict with this goal. Such an approach can work with packaged or non-packaged outputs delivering various types of content.

In some embodiments, the aggregate bit rate budget can be modifiable during the processing of the channels of content. It may be desirable to enable to increase or reduce the maximum bit rate at various times, at least within guidelines set for the system. For example, a customer may not be able to decrease the bit rate beyond a minimum amount needed for service level agreements, or increase the bit rate beyond a capacity of the network backbone. There may be a time of unexpectedly high or low consumption, which may cause the customer to want to adjust the total bit rate cap accordingly. Further, the customer may get feedback from customers that the quality is dipping on one or more channels, such that the customer wants to obtain a higher bit rate, at least for a period of time. Further, in some embodiments there may be some quality monitoring performed that may determine that the quality is falling below a specified target, which might generate a recommendation to increase bit rate for a determined period, or may cause a short term bit rate increase where permitted. Similarly, if it is determined during the monitoring that a larger than expected bit rate remains after usage for the higher standard channels, then the bit rate cap may be reduced in similar fashion. A customer may be able to specify one or more policies or rules for adjusting the cap, such as to have higher bit rate caps during prime time or peak hours, as a lower bit rate cap during off peak periods. Customers may also use a console or interface to adjust dynamically as desired. Various types of business rules or logic can be applied as well that can dynamically adjust the maximum bit rate for a customer over time.

Referring again to FIG. 9, the output can be provided to a primary distribution point and a backup distribution point. In some embodiments a process can be utilized at the egress points between 908 and 910 or between 908 and 912 that can measure and report the actual bandwidth consumed. The remaining bit rate allocator can provide the allocation budgets to the various statmux controllers, but a component or process placed at the actual egress point can determine the actual bandwidth used for the bulk transport at any point in time. This can provide a diagnostic tool to determine whether the system is performing as intended in real time.

Figure 10:
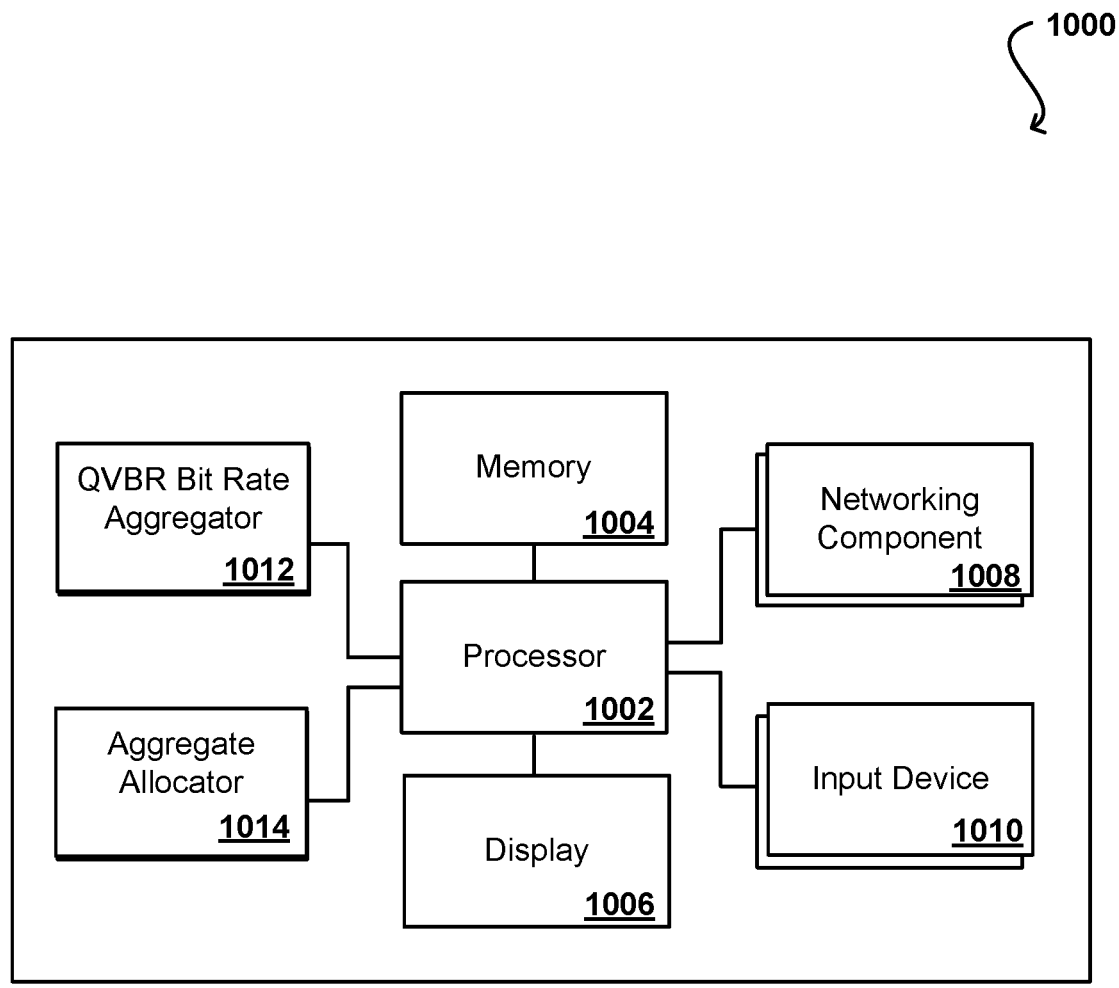
FIG. 10 illustrates example components of a computing device that can be used to implement aspects of various embodiments.

FIG. 10 illustrates a set of basic components of an example computing device 1000 that can be utilized to implement aspects of the various embodiments. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device may include at least one type of display element 1006, such as a touch screen, electronic ink (e-ink), organic light emitting diode (OLED) or liquid crystal display (LCD), although devices such as servers might convey information via other means, such as through a system of lights and data transmissions. The device typically will include one or more networking components 1008, such as a port, network interface card, or wireless transceiver that enables communication over at least one network. The device can include at least one input device 1010 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Such a computing device may be used to implement various aspects of various embodiments presented herein. This may include the execution of functionality through software on one or more instances of the computing device. For example, the device 1000 illustrated in FIG. 10 may be part of a bit rate management system that includes or provides applications, components, or services for determining bit rate usage and adjusting bit rate allocations based at least in part thereon. As discussed, this can include a bit rate aggregator 1012 that can collect bit rate information for a specified period of time from a set of QVBR encoders. The system may also include an aggregate allocator 1014 that can compare the collected bit rate information for the QVBR encoders against a total or maximum bit rate for the period, to determine a remaining amount of bit rate that can then be allocated across the remaining channels. The computing device 1000 can then use one of the networking components to provide the allocation information to the relevant statmux controllers, or other such systems and services as discussed herein.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C#or C++ or any scripting language, such as Perl, Python or TCL, as well as combinations thereof. The server(s) may also include database servers, including without limitation those commercially available from Oracle °, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   identifying a plurality of channels of media content, wherein the each of the plurality of channels is associated with a respective quality criteria;
   determining a maximum bit rate for a plurality of variable bit encoders;
   allocating a first bit rate of the maximum bit rate to a first subset of the plurality of channels based on the quality criteria of each of the first subset of channels;
   causing a first subset of the plurality of channels to be encoded by the encoders based on the first bit rate;
   determining a remaining bit rate based on the quality criteria of the channels of the first subset of channels and the maximum bit rate;
   allocating the remaining bit rate to a second subset of the channels;
   causing a second subset of the plurality of channels to be encoded by the encoders based on the remaining bit rate; and
   causing the media content for the first subset of the channels and the second subset of the channels to be transmitted to a target destination.

2. The method of claim 1, wherein the quality criteria of each of the first subset of channels is higher than the quality criteria of each the second subset of channels.

3. The method of claim 1, wherein determining the maximum bit rate is based on the quality criteria of the channels.

4. The method of claim 3, further comprising:
   determining, based on the quality criteria of the channels, a required bit rate;
   transmitting quality recommendations, wherein the quality recommendations includes the required bit rate; and
   receiving a new maximum bit rate.

5. The method of claim 1, wherein the quality criteria of at least one of channels includes a minimum bit rate threshold.

6. The method of claim 1, further comprising:
   detecting a change in quality criteria of one or more of the channels for a period of time;
   reallocating one of the first bit rate and the remaining bit rate based on the change in quality criteria; and
   causing the first subset and second subset of the plurality of the channels to be encoded based on the reallocated bit rates for the period of time.

7. The method of claim 1, wherein the media content is live media content.

8. The method of claim 1, wherein the quality criteria of one or more of the channels is updated based on a change in content of the one or more channels.

9. The method of claim 8, further comprising:
   updating the quality criteria of one or more of the channels based on the updated quality criteria.

10. The method of claim 1, further comprising:
    determining a current customer bit rate allocation;
    determining a required bit rate based on the quality criteria of the channels;
    determining that the required bit rate exceeds the current customer bit rate allocation;
    transmitting a notification to the customer that the required bit rate is higher than the current customer bit rate allocation; and
    receiving a new customer bit rate allocation, wherein the maximum bit rate is determined based on the new customer bit rate allocation.

11. A computer-implemented method, comprising:
    receiving a plurality of standard channels from a customer;
    providing each of the plurality of standard channels to one of a plurality of standard variable rate encoders, each configured to encode a received standard channel into a plurality of standard encoding of varying quality;
    receiving a plurality of quality channels from the customer, wherein each of the plurality of channels is associated with a quality criteria;
    providing each of the plurality of quality channels to a quality variable rate encoder configured to encode a received quality channel into a quality encoding based on the quality criteria;
    determining an aggregate bit rate for the quality encodings;
    determining a remaining bit rate based on the aggregate bit rate and a maximum bit rate; and
    selecting a standard encoding from each of the plurality of standard variable rate encoders based on the remaining bit rate.

12. The method of claim 11, further comprising:
    transmitting each of the selected standard encodings to one or more viewing devices; and
    transmitting the plurality of quality encodings to the one or more viewing devices.

13. The method of claim 12, further comprising:
    receiving an aggregate budget from the customer;
    receiving viewership data from the one or more viewing devices; and determine an estimated data overage based on the budget and the viewership data, wherein selecting the standard encodings is further based on the data overage estimate.

14. The method of claim 11, wherein selecting the standard encoding is performed by a statmux pool.

15. The method of claim 11, further comprising:
providing quality recommendations to the customer; and
receiving updated quality from the customer.

16. A system, comprising:
one or more standard variable rate encoders, wherein each of the one or more standard variable rate encoders is configured to:
receive a standard channel from a plurality of standard channels from a customer; and
encode the standard channel into a plurality of standard encodings of varying quality;
a statmux pool configured to select one of the plurality of standard encodings from each of the one or more standard variable rate encoders;
one or more quality variable rate encoders, wherein each of the one or more quality variable rate encoders is configured to:
receive a quality channel and quality criteria from a plurality of quality channels from the customer; and
encode the quality channel into a quality encoding; and
an aggregate allocator configured to:
determine a maximum bit rate output from the one or more quality variable bit rate encoders;
determine a remaining bit rate for encoding the plurality of standard channels based on a maximum bit rate; and
notify the statmux pool to select encodings from the one or more standard variable rate encoders based on the remaining bit rate.

17. The system of claim 16, further comprising:
An egress aggregate monitor configured to:
receive viewership data from one or more viewing devices that are provided the quality channels and standard channels; and
cause quality recommendations to be provided to the customer based on the viewership data.

18. The system of claim 16, wherein the encoders are further configured to:
adjust the varying qualities of output based on updated quality criteria from the customer.

19. The system of claim 16, wherein one or more of the standard channels includes a minimum quality criteria.

20. The system of claim 19, wherein the aggregate allocator is further configured to:
determine that the quality criteria of the plurality of quality channels and the minimum quality criteria of the one or more standard channels exceeds the maximum bit rate; and
provide a request to the customer to increase the maximum bit rate.

* * * * *